(12) United States Patent
Tripathi (10) Patent No.: US 10,277,527 B1
(45) Date of Patent: Apr. 30, 2019

(54) UTILIZATION OF NETWORK TUNNEL SIGNALING FOR CONNECTION REQUEST RATE LIMITATION

(71) Applicant: Juniper Networks, Inc., Sunnyvale, CA (US)

(72) Inventor: Vinay Kumar Tripathi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 155 days.

(21) Appl. No.: 14/865,768

(22) Filed: Sep. 25, 2015

(51) Int. Cl.
*H04L 12/911* (2013.01)
*H04L 12/923* (2013.01)

(52) U.S. Cl.
CPC .......... *H04L 47/762* (2013.01); *H04L 47/825* (2013.01)

(58) Field of Classification Search
CPC ........................... H04L 47/762; H04L 47/825
See application file for complete search history.

(56) References Cited

U.S. PATENT DOCUMENTS

| | | | | |
|---|---|---|---|---|
| 7,487,243 B1* | 2/2009 | Zielinski | ............. | H04L 12/2856 370/237 |
| 7,760,636 B1* | 7/2010 | Cheriton | ............... | H04L 1/1874 370/230 |
| 2006/0187942 A1* | 8/2006 | Mizutani | ............. | H04L 12/5695 370/401 |
| 2010/0302932 A1* | 12/2010 | Himeno | ............... | H04L 12/4633 370/216 |
| 2013/0191537 A1* | 7/2013 | Ivanov | ............... | H04L 29/12066 709/224 |
| 2015/0009990 A1* | 1/2015 | Sung | .................... | H04W 76/022 370/392 |
| 2016/0373317 A1* | 12/2016 | Ali | ....................... | H04L 41/0896 |

OTHER PUBLICATIONS

RFC 5515 Layer 2 Tunneling Protocol Access Line Information Attribute Value Pair (AVP) Extensions Mammoliti et al. May 2009.*
Cisco TechNotes Updated Sep. 9, 2005, L2TP Load Balancing and Failover Document ID: 23981 Internet download at : http://www.cisco.com/c/en/us/support/docs/dial-access/virtual-private-dialup-vpnd/23981.html.*
Townsley et al. Aug. 1999 RFC 2661: Layer Two Tunneling Protocol "L2TP".*

* cited by examiner

*Primary Examiner* — Jeffrey M Rutkowski
*Assistant Examiner* — Basil Ma
(74) *Attorney, Agent, or Firm* — Harrity & Harrity, LLP (57) ABSTRACT

A device may determine an acceptance rate threshold associated with a network server. The acceptance rate threshold may be a handling capacity of the network server for processing connection requests. The device may determine that a rate at which a set of connection requests are being received exceeds the acceptance rate threshold. The device may cause a portion of the set of connection requests to be transmitted to the network server via a network tunnel based on determining that the rate at which the set of connection requests are being received exceeds the acceptance rate threshold. The portion of the set of connection requests may be caused to be transmitted at a rate not exceeding the acceptance rate threshold.

20 Claims, 7 Drawing Sheets

UTILIZATION OF NETWORK TUNNEL SIGNALING FOR CONNECTION REQUEST RATE LIMITATION

BACKGROUND

A tunneling protocol, such as a layer 2 tunneling protocol (L2TP), may be utilized for communication by a set of network devices of a network (e.g., a virtual private network). For example, an access concentrator (e.g., an L2TP access concentrator (LAC)) and a network server (e.g., an L2TP network server (LNS)) may utilize L2TP when communicating via a network tunnel (e.g., an L2TP network tunnel). The LAC may receive a set of connection requests (e.g., from a set of client devices), and may direct the set of connection requests to the LNS via the L2TP network tunnel. The LNS may approve a connection request, deny a connection request, or the like.

SUMMARY

According to some possible implementations, a device may include one or more processors. The one or more processors may determine an acceptance rate threshold associated with a network server. The acceptance rate threshold may be a handling capacity of the network server for processing connection requests. The one or more processors may determine that a rate at which a set of connection requests are being received exceeds the acceptance rate threshold. The one or more processors may cause a portion of the set of connection requests to be transmitted to the network server via a network tunnel based on determining that the rate at which the set of connection requests are being received exceeds the acceptance rate threshold. The portion of the set of connection requests may be caused to be transmitted at a rate not exceeding the acceptance rate threshold.

According to some possible implementations, a computer-readable medium may store one or more instructions that, when executed by one or more processors, may cause the one or more processors to receive network traffic directed to a network server. The one or more instructions, when executed by one or more processors, may cause the one or more processors to establish a network tunnel with the network server based on receiving the network traffic directed to the network server. The one or more instructions, when executed by one or more processors, may cause the one or more processors to determine that a rate at which the network traffic is being received for transmission via the network tunnel exceeds a rate threshold. The rate threshold may be associated with a handling capacity of the network server. The one or more instructions, when executed by one or more processors, may cause a portion of the network traffic to be transmitted to the network server via the network tunnel. The portion of the network traffic may be transmitted at a rate not exceeding the rate threshold.

According to some possible implementations, a method may include establishing, by a device, a layer 2 tunneling protocol (L2TP) network tunnel using one or more L2TP signaling messages. The one or more L2TP signaling messages may include a particular message identifying a call acceptance rate (CAR) threshold for an L2TP network server (LNS). The method may include receiving, by the device, a set of connection requests for transmission to the LNS via the L2TP network tunnel. The set of connection requests may be received at a first call per second (CPS) rate. The method may include determining, by the device, that the first CPS rate exceeds the CAR threshold. The method may include selecting, by the device, a subset of the set of connection requests based on determining that the first CPS rate exceeds the CAR threshold. The method may include causing, by the device, the subset of the set of connection requests to be transmitted to the LNS via the L2TP network tunnel. The subset of the set of connection requests may be transmitted at a second CPS rate that does not exceed the CAR threshold.

DETAILED DESCRIPTION

The following detailed description of example implementations refers to the accompanying drawings. The same reference numbers in different drawings may identify the same or similar elements.

A network server may receive a set of packets corresponding to a set of connection requests (e.g., network tunnel connection requests, network session connection requests, etc.) from a set of client devices via an access concentrator. The access concentrator may receive the set of connection requests from the set of client devices, and may direct the set of connection requests to the network server via a network tunnel. For example, when utilizing a layer 2 tunneling protocol (L2TP) network tunnel, an L2TP access concentrator (LAC) may receive multiple connection requests from multiple client devices, and may forward the multiple connection requests to an L2TP network server (LNS) via the L2TP network tunnel.

The network server may experience performance degradation, unreliable performance, or the like when the quantity of packets (e.g., packets associated with connection requests) that are directed to the network server for processing and/or acknowledgement exceeds a threshold. For example, after a service interruption resulting in multiple client devices being disconnected from the network server, the network server may receive connection requests from the multiple client devices after the service interruption has ended, and the quantity of connection requests may exceed the threshold. An event rate analyzer may be utilized by the network server to reject some packets; however, the network server may still process the rejected packets to generate acknowledgement messages for the rejected packets. Implementations, described herein, may facilitate ensuring that the quantity of connection requests, which are directed to the network server, does not exceed a threshold, thereby reducing a likelihood that the network server experiences degraded performance from excessive packet processing and/or acknowledgement message generation.

Figure 1:
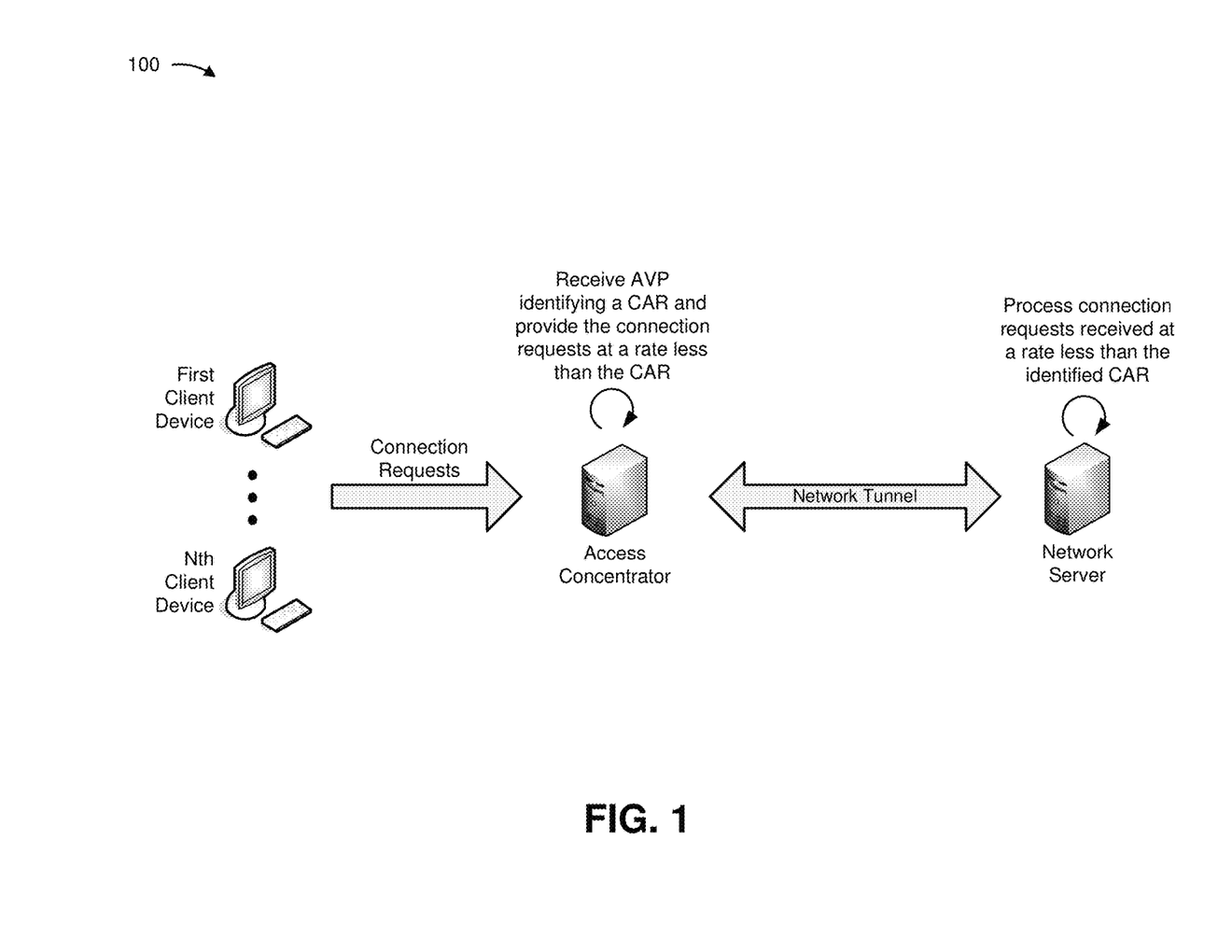
FIG. 1 is a diagram of an overview of an example implementation described herein.

FIG. 1 is a diagram of an overview of an example implementation 100 described herein. As shown in FIG. 1, example implementation 100 includes a set of client devices (e.g., a first client device, an nth client device, etc.), an access concentrator (e.g., a LAC), and a network server (e.g., an LNS).

As further shown in FIG. 1, the set of client devices may transmit a set of connection requests to the access concentrator. For example, a set of users of the set of client devices may desire access to information stored by the network server, and may transmit requests for a connection to the network server. The request may be routed to the access concentrator based on a routing scheme, a routing address, or the like. The access concentrator may facilitate establishment of a network tunnel (e.g., an L2TP network tunnel) with which the access concentrator and the network server may communicate and/or direct network traffic based on receiving the set of connection requests. The access concentrator may determine a call acceptance rate (CAR) associated with the network server. The CAR threshold may refer to a handling capacity of the network server (e.g., a threshold rate at which the network server is capable of receiving and/or processing connection requests without experiencing performance degradation). For example, the access concentrator may request information identifying the CAR, and may receive an attribute-value pair (AVP) identifying the CAR threshold for the network server. The attribute portion of the AVP may indicate that the AVP identifies the CAR threshold for the network server. The value portion of the AVP may identify the CAR threshold for the network server. Another portion of a message including the AVP (e.g., header information) may identify the network server for which the CAR threshold is identified. The access concentrator may determine that the access concentrator is receiving the set of connection requests at a particular rate of calls per second (CPS), and may determine that the CPS rate exceeds the CAR threshold.

As further shown in FIG. 1, based on determining that the CPS rate exceeds the CAR threshold, the access concentrator may filter the set of connection requests. For example, the access concentrator may provide one or more connection requests, of the set of connection requests, via the network tunnel such that the CAR threshold is not exceeded. The access concentrator may queue other connection requests of the set of connection requests, and may subsequently provide the other connection requests. In another example, the access concentrator may reject other connection requests of the set of connection requests. The network server may receive the one or more connection requests from the access concentrator and via the network tunnel. The network server may process and/or acknowledge the one or more connection requests based on receiving the one or more connection requests. For example, the network server may approve a connection request, deny a connection request, or the like.

In this way, the access concentrator reduces a quantity of connection requests and/or associated packets received by a network server, thereby improving performance of the network server relative to the network server receiving an excess quantity of connection requests and/or packets.

Figure 2:
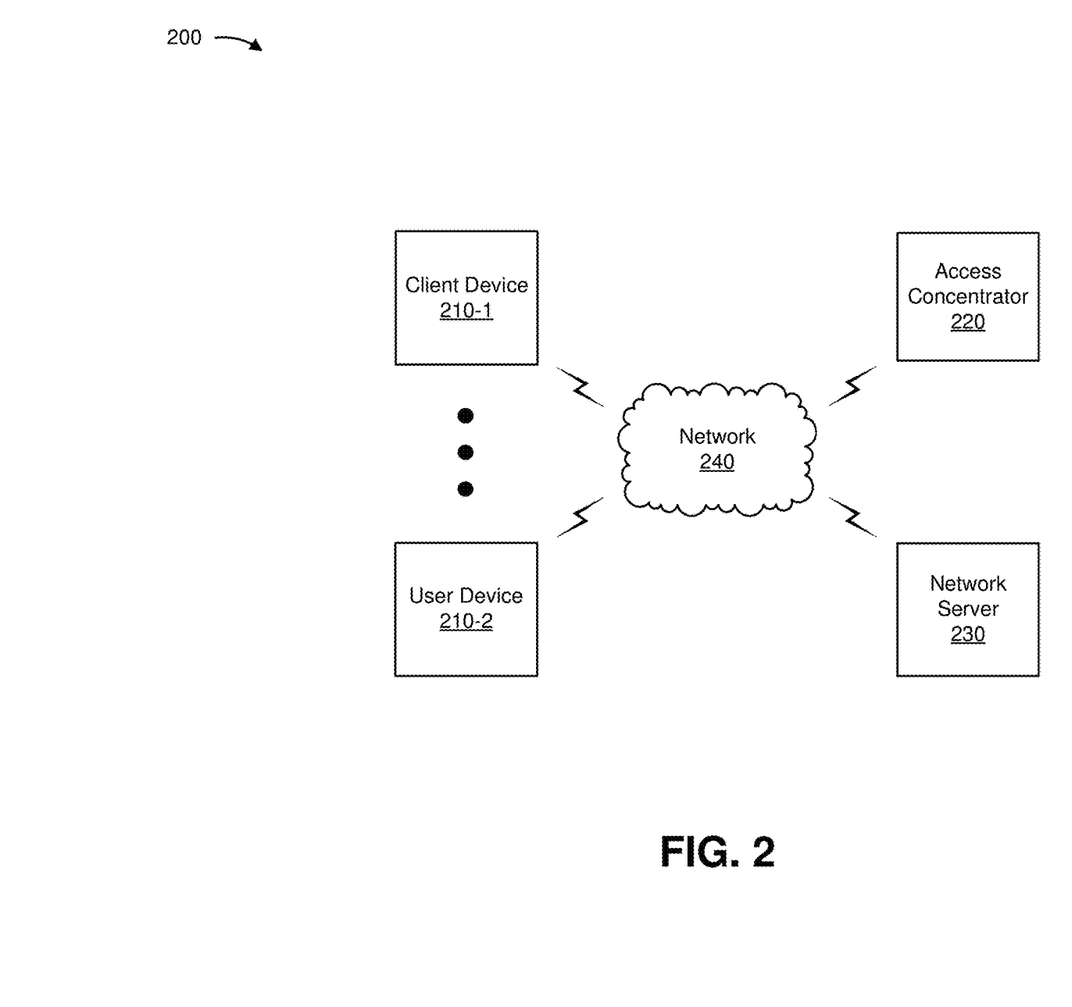
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-N (N≥1) (hereinafter referred to collectively as "client devices 210," and individually as "client device 210"), an access concentrator 220, a network server 230, and a network 240. Devices of environment 200 may interconnect via wired connections, wireless connections, or a combination of wired and wireless connections.

Client device 210 may include one or more devices capable of receiving, generating, storing, processing, and/or providing information associated with a connection request. For example, client device 210 may include a communication and/or computing device, such as a mobile phone (e.g., a smart phone, a radiotelephone, etc.), a laptop computer, a tablet computer, a handheld computer, a gaming device, a set-top box, a wearable communication device (e.g., a smart wristwatch, a pair of smart eyeglasses, etc.), or a similar type of device. In some implementations, client device 210 may provide multiple connection requests. For example, client device 210 may provide a first connection request and, when the first connection request is not acknowledged within a threshold period of time, may provide a second connection request. In some implementations, client device 210 may receive information from and/or transmit information to another device in environment 200.

Access concentrator 220 may include one or more devices capable of storing, processing, and/or routing information. For example, access concentrator 220 may include a traffic transfer device, such as a gateway, a router, a modem, a switch, a firewall, a network interface card (NIC), a hub, a bridge, a server device, or any other type of device that processes and/or transfers traffic. In some implementations, access concentrator 220 may include an endpoint device of a network tunnel. For example, access concentrator 220 may include a LAC for an L2TP network tunnel. In some implementations, access concentrator 220 may include a communication interface that allows access concentrator 220 to receive information from and/or transmit information to other devices in environment 200.

Network server 230 may include one or more devices capable of storing, processing, and/or routing information. For example, network server 230 may include a server device that is capable of receiving and/or processing a threshold quantity of connection requests per unit time (e.g., a CAR threshold) without experiencing performance degradation. In some implementations, network server 230 may include an endpoint device of a network tunnel. For example, network server 230 may include an LNS for an L2TP network tunnel. In some implementations, network server 230 may include a communication interface that allows network server 230 to receive information from and/or transmit information to other devices in environment 200.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
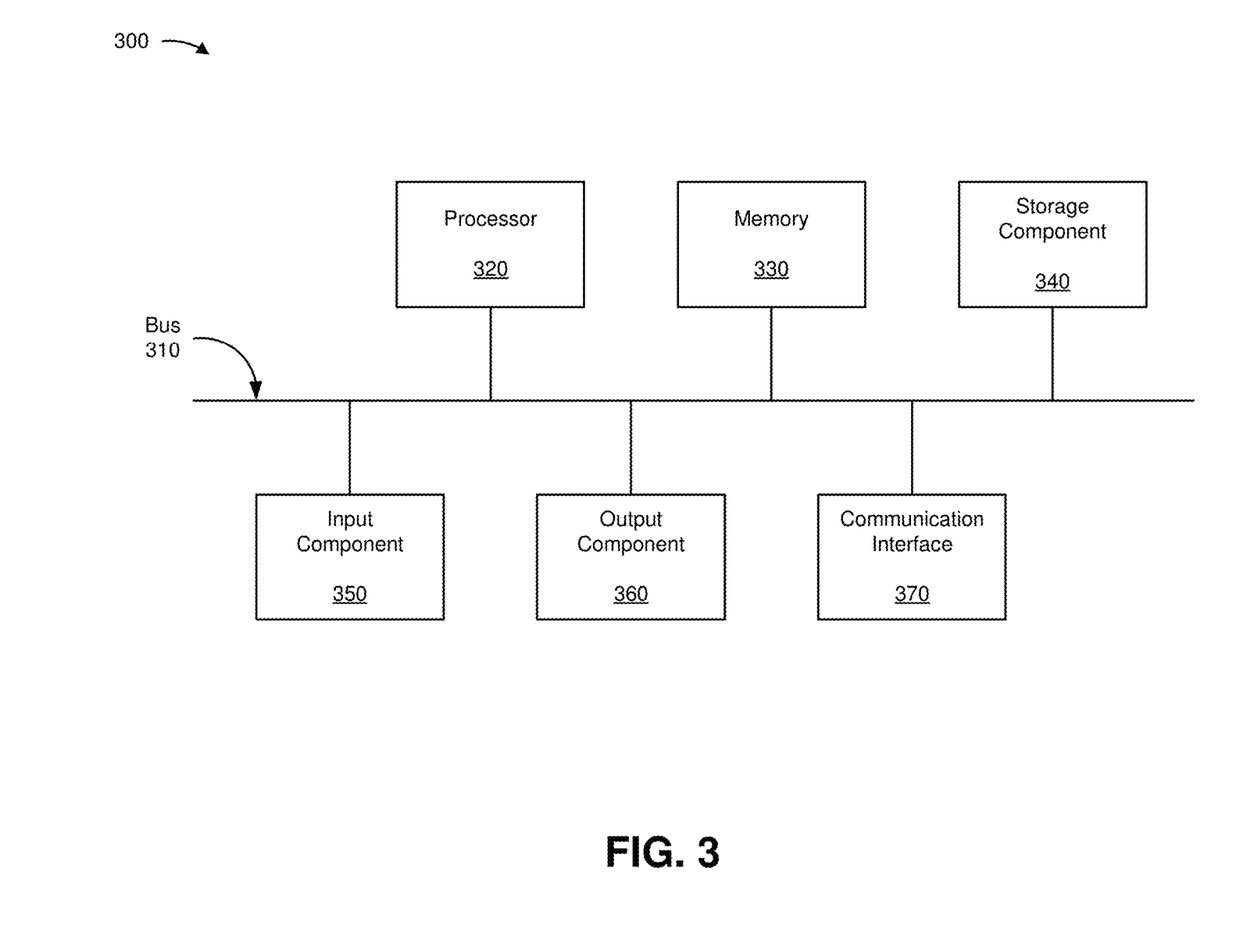
FIG. 3 is a diagram of example components of one or more devices of FIG. 2.

FIG. 3 is a diagram of example components of a device 300. Device 300 may correspond to client device 210, access concentrator 220, and/or network server 230. In some implementations, client device 210, access concentrator 220, and/or network server 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
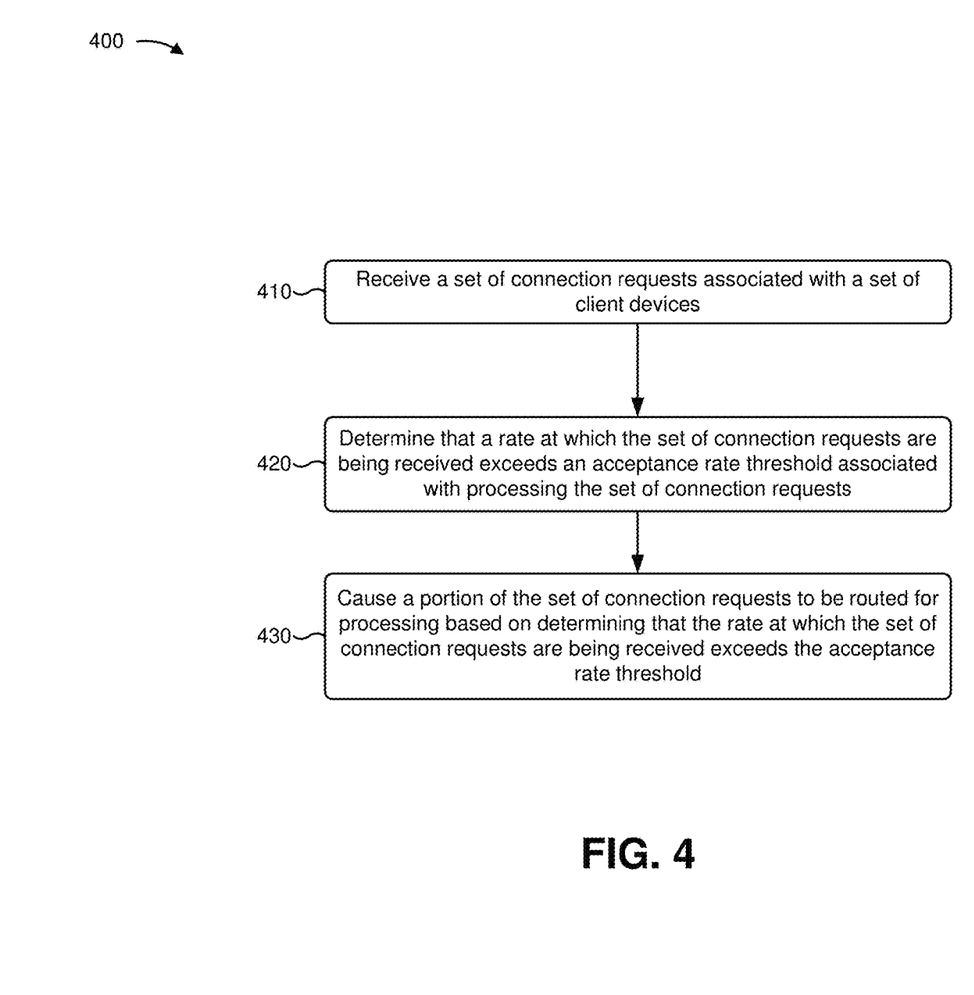
FIG. 4 is a flow chart of an example process for managing a set of connection requests.

FIG. 4 is a flow chart of an example process 400 for managing a set of connection requests. In some implementations, one or more process blocks of FIG. 4 may be performed by access concentrator 220. In some implementations, one or more process blocks of FIG. 4 may be performed by another device or a group of devices separate from or including access concentrator 220, such as client device 210 and/or network server 230.

As shown in FIG. 4, process 400 may include receiving a set of connection requests associated with a set of client devices (block 410). For example, access concentrator 220 may receive the set of connection requests associated with the set of client devices 210. In some implementations, access concentrator 220 may receive the set of connection requests based on a routing scheme. For example, the set of client devices 210 may be configured to transmit connection requests, intended for network server 230, to access concentrator 220. Additionally, or alternatively, access concentrator 220 may be configured to receive connection requests transmitted to network server 230. For example, access concentrator 220 may intercept one or more connection requests transmitted toward network server 230. In this way, access concentrator 220 ensures that the set of client devices 210 do not transmit connection requests directly to network server 230, which could result in the quantity of connection requests exceeding a threshold associated with network server 230 and causing network server 230 to experience a performance degradation.

In some implementations, access concentrator 220 may establish the network tunnel based on receiving the set of network connection requests. For example, access concentrator 220 may receive a connection request and may transmit a network tunnel establishment request (e.g., an L2TP message) to network server 230. In this case, network server 230 may facilitate establishment of the network tunnel and/or transmit an acknowledgement message based on receiving the request. For example, network server 230 may establish the network tunnel, provide information to access concentrator 220 associated with permitting access concentrator 220 to establish the network tunnel (e.g., routing information), or the like. Additionally, or alternatively, access concentrator 220 may establish the network tunnel based on determining that another network tunnel has been removed. For example, when network server 230 experiences a service interruption, a first network tunnel connecting access concentrator 220 and network server 230 may be disconnected. In this case, access concentrator 220 may cause a second network tunnel to be established, and may receive the set of connection requests based on the service interruption and based on the second network tunnel being established.

As further shown in FIG. 4, process 400 may include determining that a rate at which the set of connection requests are being received exceeds an acceptance rate threshold associated with processing the set of connection requests (block 420). For example, access concentrator 220 may determine that a CPS rate exceeds a CAR threshold. In some implementations, access concentrator 220 may determine that the CPS rate is within a threshold amount of the CAR threshold. For example, access concentrator 220 may determine that the CPS rate is within a particular percentage of the CAR threshold (e.g., 1%, 5%, 20%), and may trigger filtering of connection requests based on the CPS rate being within the particular percentage of the CAR threshold. Additionally, or alternatively, access concentrator 220 may determine that the CPS rate is likely to exceed the CAR threshold within a threshold period of time. For example, access concentrator 220 may determine a CPS rate trend based on tracking a change to the CPS rate, and may determine that the CPS rate is likely to exceed the CAR threshold within the threshold period of time (e.g., 1 second, 5 seconds, 10 seconds, etc.). In this way, access concentrator 220 can trigger filtering of connection requests before network server 230 is overloaded by connection requests.

In some implementations, access concentrator 220 may receive information identifying the acceptance rate when establishing a network tunnel connecting access concentrator 220 and network server 230. For example, when access concentrator 220 transmits a request to establish the network tunnel (e.g., an L2TP start control connect request (SCCRQ) message) to network server 230, network server 230 may transmit a response (e.g., an L2TP start control connection reply (SCCRP) message) that includes information identifying the CAR threshold (e.g., as an AVP of the SCCRP message). In this way, access concentrator 220 utilizes L2TP network tunnel establishment signaling to determine an acceptance rate associated with network server 230.

In some implementations, access concentrator 220 may receive information identifying the acceptance rate based on providing information indicating that access concentrator 220 is capable of filtering the set of connection requests based on the acceptance rate. For example, network server 230 may transmit a message (e.g., an SCCRP message) confirming compatibility with utilizing the CAR threshold, such as an AVP identifying the CAR threshold, an AVP checking compatibility without identifying the CAR threshold, or the like. In this case, access concentrator 220 may provide a response message (e.g., a start control connected (SCCN) message) confirming compatibility with utilizing the CAR threshold, such as an AVP confirming the received CAR threshold, an AVP confirming compatibility without identifying a received CAR threshold, or the like. In this way, network server 230 integrates with legacy access concentrators 220 not capable of receiving information identifying a CAR threshold and limiting a CPS rate based on the CAR threshold.

In some implementations, access concentrator 220 may receive information identifying the acceptance rate based on the rate at which connection requests are being received exceeding the acceptance rate. For example, when access concentrator 220 provides connection requests to network server 230 via the network tunnel at a CPS rate exceeding the CAR threshold, network server 230 may provide information to access concentrator 220 identifying the CAR threshold and/or instructing access concentrator 220 to reduce the CPS rate below the CAR threshold.

In some implementations, access concentrator 220 may receive information identifying an updated acceptance rate. For example, access concentrator 220 may receive a first CAR threshold that may be utilized to filter connection requests for a first period of time, and may subsequently receive a second CAR threshold that may be utilized to filter connection requests for a second, subsequent period of time. In this case, access concentrator 220 may cause one or more connection requests to be provided at a CPS rate that does not exceed the second CAR threshold.

In some implementations, access concentrator 220 may receive information identifying a portion of the acceptance rate intended for access concentrator 220. For example, when network server 230 is connected via multiple network tunnels to multiple access concentrators 220, a first access concentrator 220 may receive information identifying a first CAR threshold and a second access concentrator 220 may receive information identifying a second CAR threshold (with the first CAR threshold and the second CAR threshold not totaling an amount greater than a CAR threshold of network server 230). In this way, multiple access concentrators 220 may connect to the same network server 230 without causing an excessive quantity of connection requests to be directed to network server 230.

In some implementations, access concentrator 220 may determine the rate at which the set of connection requests are being received. For example, access concentrator 220 may determine a CPS rate associated with the set of connection requests. In some implementations, access concentrator 220 may determine the rate at which the set of connection requests are being received on a per time unit basis. For example, access concentrator 220 may determine the CPS rate on a per second basis. Additionally, or alternatively, access concentrator 220 may determine the CPS rate on an average rate basis (e.g., an average CPS rate for a 5 second interval, a 10 second interval, a 20 second interval, etc.), a weighted average rate basis (e.g., a weighted average CPS rate based on CPS rates determined for multiple time intervals), or the like.

As further shown in FIG. 4, process 400 may include causing a portion of the set of connection requests to be routed for processing based on determining that the rate at which the set of connection requests are being received exceeds the acceptance rate threshold (block 430). For example, access concentrator 220 may cause one or more connection requests, of the set of connection requests, to be routed for processing by network server 230 based on determining that the CPS rate exceeds the CAR threshold. In some implementations, access concentrator 220 may cause the portion of the set of connection requests to be provided at another CPS rate. For example, when access concentrator 220 receives the set of connection requests at a first CPS rate that exceeds the CAR threshold and selects a subset of the set of connection requests, access concentrator 220 may provide the subset of the set of connection requests such that a second CPS rate, associated with providing the subset of the set of connection requests, does not exceed the CAR threshold.

In some implementations, access concentrator 220 may select one or more connection requests as the portion of the set of connection requests based on one or more selection criteria. For example, access concentrator 220 may select a particular connection request based on an order in which the set of connection requests arrive (e.g., selecting arriving connection requests until the CAR threshold for a particular time increment is satisfied, then selecting the next arriving connection requests when at the next time increment). Additionally, or alternatively, access concentrator 220 may select the one or more connection requests based on a prioritization of client devices 210 (e.g., different client devices 210 may be associated with different prioritizations, such as based on a seniority of user, a type of connection request, etc.), a type of connection request (e.g., a network tunnel connection request, a network session connection request, etc.), or the like.

In some implementations, access concentrator 220 may queue one or more connection requests that are not selected for forwarding to network server 230. For example, access concentrator 220 may queue a particular connection request for a period of time, and may direct the particular connection request to network server 230 after the period of time has elapsed. Additionally, or alternatively, access concentrator 220 may queue the particular connection request, and may provide the particular connection request after the CPS rate reduces to below the CAR threshold. Additionally, or alternatively, access concentrator 220 may drop one or more connection requests that are not selected for forwarding to network server 230. In this case, access concentrator 220 may provide a response message indicating that a particular connection request was dropped.

In some implementations, access concentrator 220 may filter the set of connection requests until the rate at which the set of connection requests are being received does not exceed the acceptance rate threshold. For example, access concentrator 220 may continue to cause a portion of the set of connection requests to be routed to network server 230 until the CPS rate does not exceed the CAR threshold, the CPS rate is a particular percentage less than the CAR threshold, a queue of queued connection requests is emptied, or the like. In this case, access concentrator 220 may continue to monitor the CPS rate, and may return to filtering the set of connection requests when the CPS rate exceeds the CAR threshold. In this way, access concentrator 220 reduces a likelihood that network server 230 is overloaded by connection requests, thereby improving performance of network server 230.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
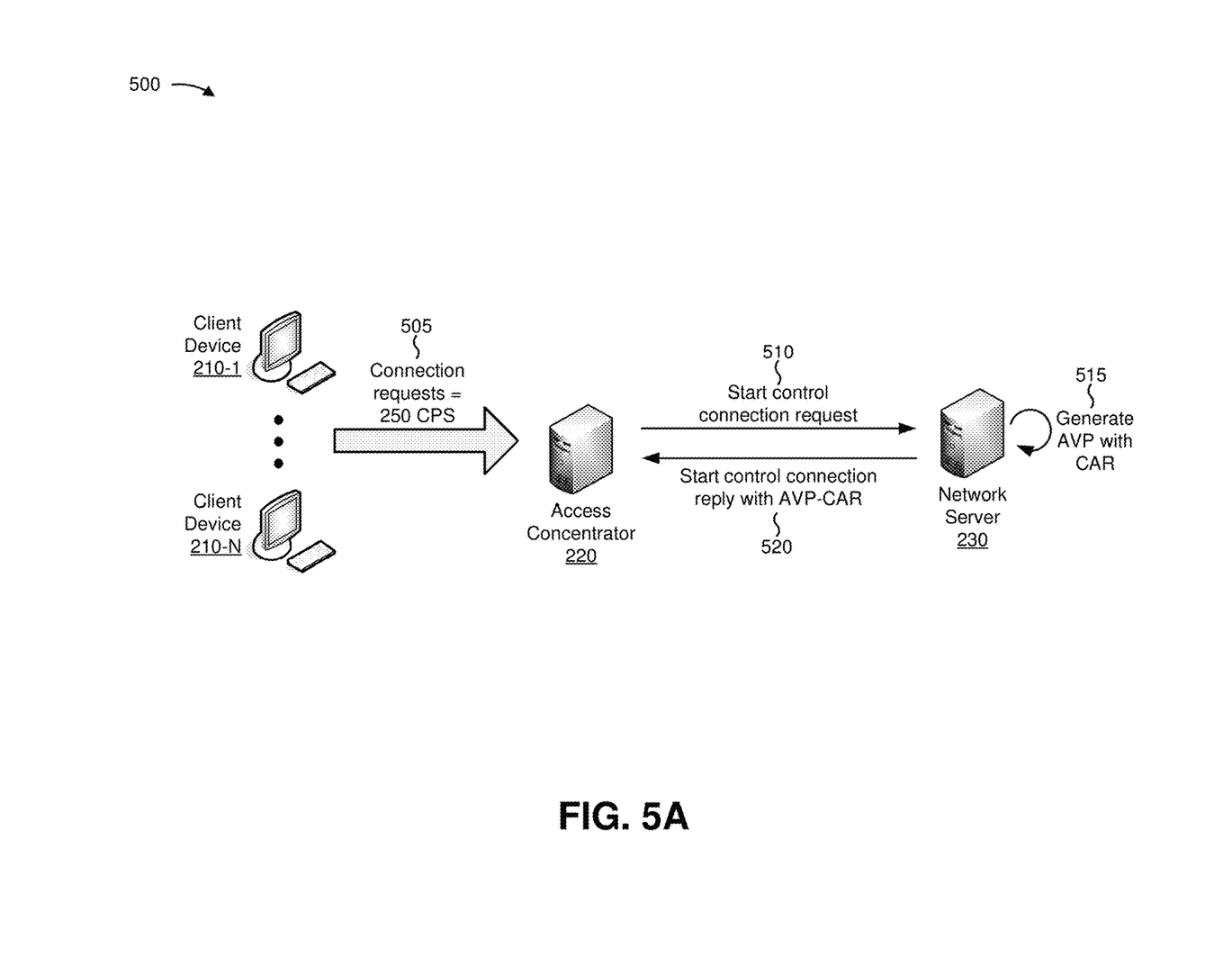
FIGS. 5A-5C are diagrams of an example implementation relating to the example process shown in FIG. 4.
Figure 5B:
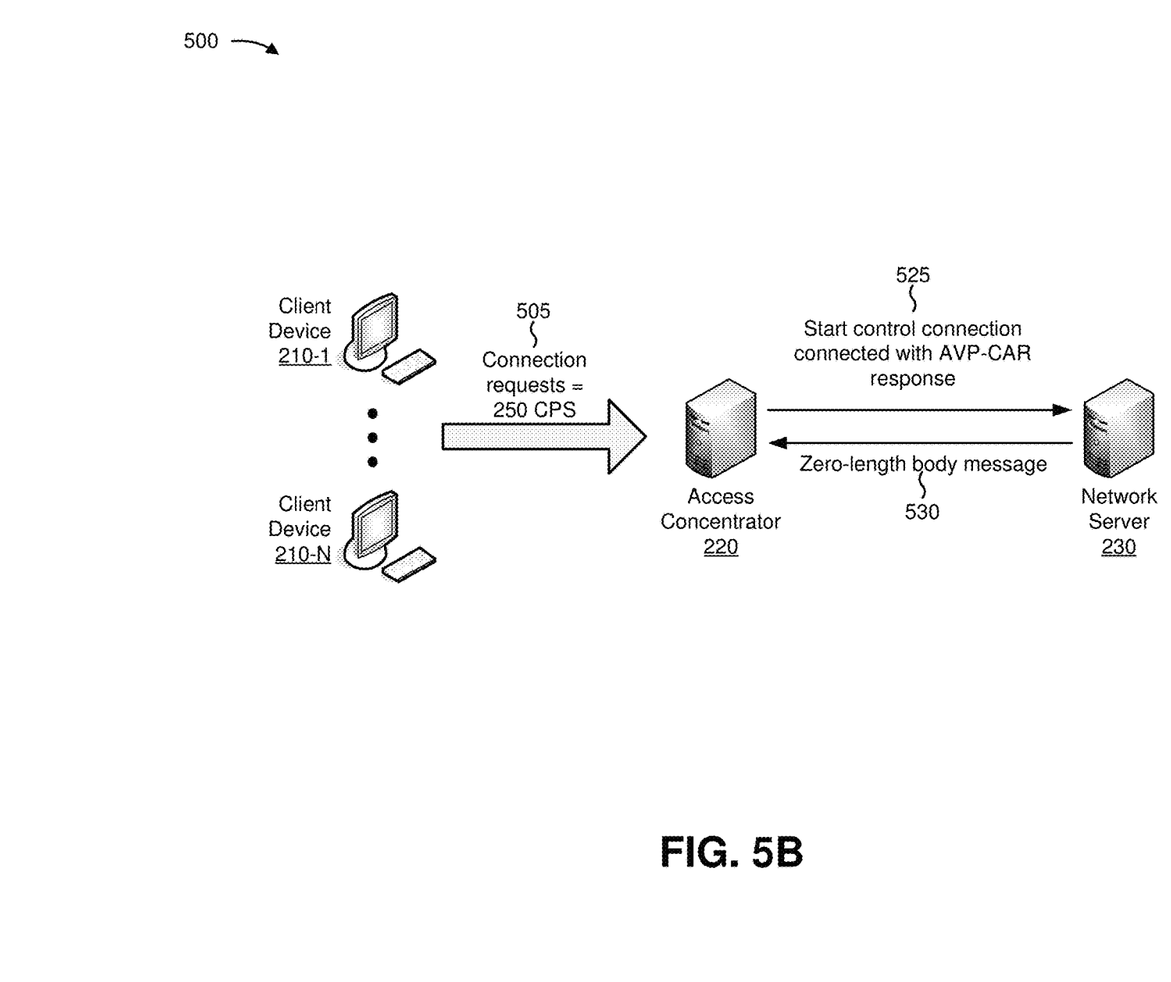
Figure 5C:
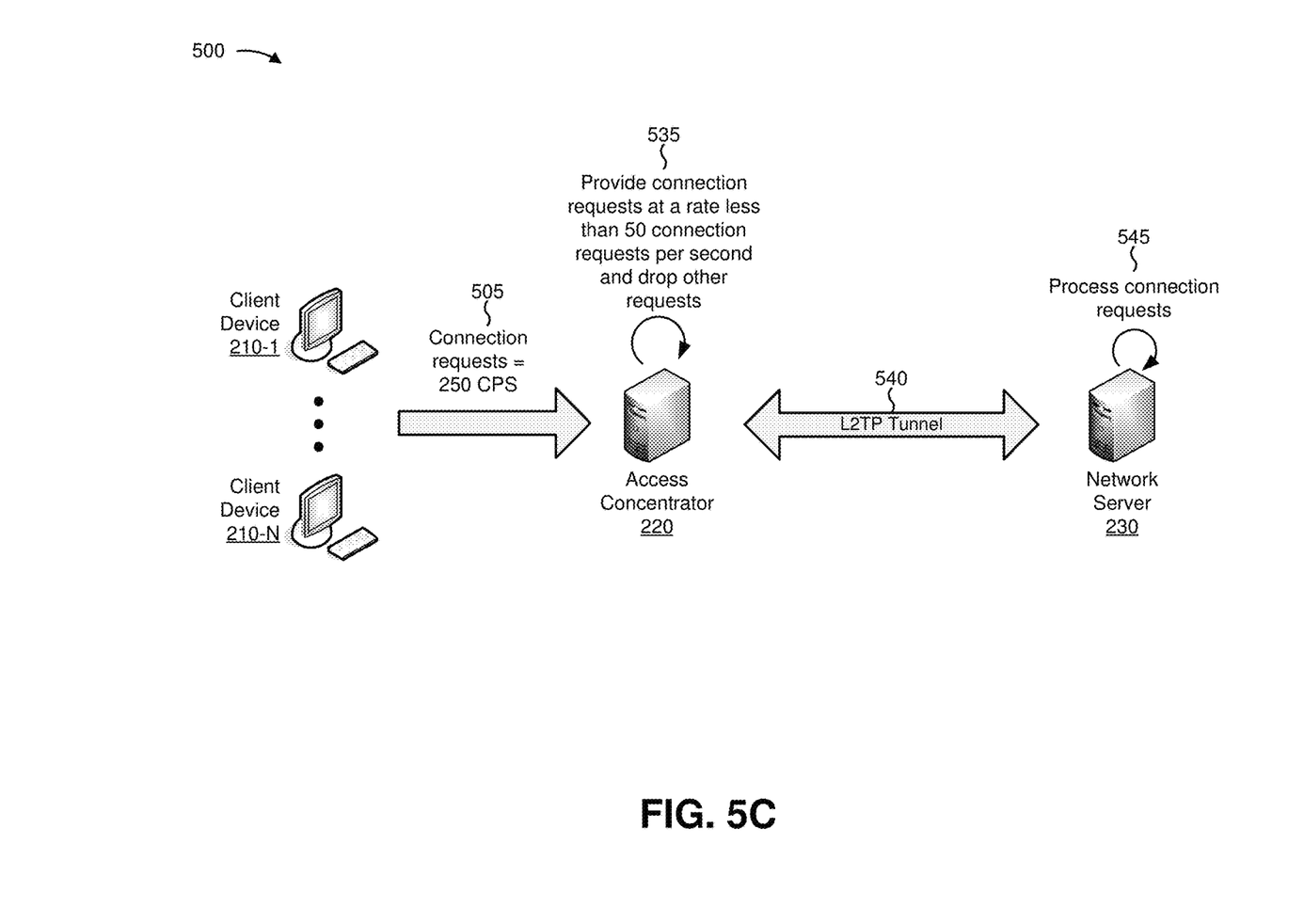

FIGS. 5A-5C are diagrams of an example implementation 500 relating to example process 400 shown in FIG. 4. FIGS. 5A-5C show an example of managing a set of connection requests.

As shown in FIG. 5A, and by reference number 505, access concentrator 220 receives a set of connection requests at a rate of 250 CPS from a set of client devices 210-1 through 210-N. As shown by reference number 510, access concentrator 220 transmits an L2TP SCCRQ message to cause an L2TP network tunnel to be established between network server 230 and access concentrator 220. As shown by reference number 515, network server 230 generates an AVP (e.g., an attribute indicating that an associated value is the CAR threshold and the associated value of the CAR threshold) identifying a CAR threshold associated with network server 230. As shown by reference number 520, network server 230 transmits, to access concentrator 220, an L2TP SCCRP message with the AVP identifying the CAR threshold. Assume that the CAR threshold is 50 calls per second (e.g., network server 230 can process 50 connection requests per second without experiencing performance degradation).

As shown in FIG. 5B, and by reference number 525, access concentrator 220 transmits an L2TP SCCN message to network server 230. The SCCN message indicates that access concentrator 220 is utilizing the L2TP network tunnel and includes an AVP with the CAR threshold to indicate that access concentrator 220 successfully received the CAR threshold and is capable of filtering a portion of received connection requests to ensure that the CPS rate does not exceed the CAR threshold. As shown by reference number 530, network server 230 transmits, to access concentrator 220, a zero-length body (ZLB) message indicating that no further messages are queued for transmission to access concentrator 220. In this way, access concentrator 220 and network server 230 utilize L2TP signaling to establish an L2TP network tunnel and communicate a CAR threshold for utilization in filtering a portion of received connection requests.

As shown in FIG. 5C, and by reference number 535, access concentrator 220 provides connection requests at a rate less than 50 connection requests per second via L2TP tunnel 540. Access concentrator 220 drops other connection requests (e.g., the remaining 200 connection requests per second of the set of connection requests arriving at a rate of 250 CPS). As shown by reference number 545, network server 230 receives the 50 connection requests per second and processes the 50 connection requests per second without being overloaded or experiencing performance degradation.

As indicated above, FIGS. 5A-5C are provided merely as an example. Other examples are possible and may differ from what was described with regard to FIGS. 5A-5C.

In this way, L2TP signaling messages may be utilized by access concentrator 220 to facilitate a reduction in a rate at which access concentrator 220 directs connection requests to network server 230, thereby reducing a likelihood of causing degraded performance relative to overloading network server 230.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors to:
      determine an acceptance rate threshold associated with a network server,
         the acceptance rate threshold being a handling capacity of the network server for processing connection requests,
         the acceptance rate threshold being determined by the device by requesting information from the network server;
      determine that a rate at which a set of connection requests are being received exceeds the acceptance rate threshold before sending the set of connection requests to the network server;
      cause a first portion of the set of connection requests to be transmitted to the network server via a network tunnel based on determining that the rate at which the set of connection requests are being received exceeds the acceptance rate threshold,
         the first portion of the set of connection requests being caused to be transmitted at a rate not exceeding the acceptance rate threshold;
      cause a second portion of the set of connection requests to be dropped; and
      cause a third portion of the set of connection requests to be queued for a particular period of time,
         the third portion of the set of connection requests being transmitted to the network server via the network tunnel after the particular period of time has elapsed,
      where the one or more processors, when causing the third portion of the set of connection requests to be transmitted to the network server via the network tunnel, are to:
         continue to cause the third portion of the set of connection requests to be transmitted to the network server via the network tunnel until at least one of:
            the rate at which the set of connection requests are being received does not exceed the acceptance rate threshold,
            the rate at which the set of connection requests are being received is a particular percentage less than the acceptance rate threshold, or
            a queue of queued connections is emptied.

2. The device of claim 1, where the one or more processors are further to:
   receive one or more signaling messages associated with establishing the network tunnel with the network server,
      the one or more signaling messages including information identifying the acceptance rate threshold; and
   where the one or more processors, when determining the acceptance rate threshold, are to:
      determine the acceptance rate threshold based on the information identifying the acceptance rate threshold included in the one or more signaling messages.

3. The device of claim 2, where the one or more signaling messages are one or more layer 2 tunneling protocol (L2TP) signaling messages; and
   where the one or more processors, when determining the acceptance rate threshold, are further to:
      identify an attribute-value pair (AVP) associated with indicating the acceptance rate threshold; and
      determine the acceptance rate threshold based on identifying the AVP associated with indicating the acceptance rate threshold.

4. The device of claim 1, where the one or more processors, when receiving the set of connection requests for transmission to the network server via the network tunnel, are to:
   intercept one or more connection requests of the set of connection requests.

5. The device of claim 1, where the one or more processors are further to:
   cause the first portion of the set of connection requests to be transmitted to the network server via the network tunnel based on determining that the rate at which the set of connection requests are being received is likely to exceed the acceptance rate threshold within a threshold period of time.

6. The device of claim 1, where the one or more processors are further to:
   receive another set of connection requests;
   determine that a rate at which the other set of connection requests are being received does not exceed the acceptance rate threshold; and
   cause the other set of connection requests to be transmitted to the network server without filtering a portion of the other set of connection requests.

7. The device of claim 1, where the set of connection requests includes at least one of:
   a network tunnel connection request, or
   a network session connection request.

8. A computer-readable medium storing instructions, the instructions comprising:
   one or more instructions that, when executed by one or more processors, cause the one or more processors to:
      receive network traffic directed to a network server;
      establish a network tunnel with the network server based on receiving the network traffic directed to the network server;
      determine that a rate at which the network traffic is being received for transmission via the network tunnel exceeds a rate threshold before sending the network traffic to the network server,
         the rate threshold being associated with a handling capacity of the network server, and the rate threshold being determined by requesting information from the network server;
cause a first portion of the network traffic to be transmitted to the network server via the network tunnel,
the first portion of the network traffic being transmitted at a rate not exceeding the rate threshold;
cause a second portion of the network traffic to be dropped; and
cause a third portion of the network traffic to be queued for a particular period of time,
the third portion of the network traffic being transmitted to the network server via the network tunnel after the particular period of time has elapsed,
where the one or more instructions, that cause the one or more processors to cause the third portion of the network traffic to be transmitted to the network server via the network tunnel, cause the one or more processors to:
continue to cause the third portion of the network traffic to be transmitted to the network server via the network tunnel until at least one of:
the rate at which the network traffic is being received does not exceed the rate threshold,
the rate at which the network traffic is being received is a particular percentage less than the rate threshold, or
a queue of queued network traffic is emptied.

9. The computer-readable medium of claim 8, where the network traffic includes at least one of:
a connection request associated with a network tunnel connection to the network server, or
a connection request associated with a network session connection to the network server.

10. The computer-readable medium of claim 8, where the network server is a layer 2 tunneling protocol (L2TP) network server (LNS); and
where the one or more instructions, that cause the one or more processors to establish the network tunnel, cause the one or more processors to:
receive an L2TP message from the LNS associated with establishing the network tunnel,
the L2TP message including information identifying the rate threshold.

11. The computer-readable medium of claim 10, where the information identifying the rate threshold is an attribute-value pair identifying a call acceptance rate associated with the LNS.

12. The computer-readable medium of claim 8, where the one or more instructions, when executed by the one or more processors, further cause the one or more processors to:
determine the rate at which the network traffic is being received for transmission via the network tunnel to the network server.

13. The computer-readable medium of claim 12, where the one or more instructions, when executed by the one or more processors, cause the one or more processors to:
determine the rate at which the network traffic is being received based on an average rate at which the network traffic is being received during a particular time interval.

14. The computer-readable medium of claim 8, where the one or more instructions, that cause the one or more processors to receive the network traffic, cause the one or more processors to:
intercept network traffic intended for the network server.

15. A method, comprising:
establishing, by a device, a layer 2 tunneling protocol (L2TP) network tunnel using one or more L2TP signaling messages,
the one or more L2TP signaling messages including a particular message identifying a call acceptance rate (CAR) threshold for an L2TP network server (LNS), the CAR threshold being determined by the device by requesting information from the LNS;
receiving, by the device, a set of connection requests for transmission to the LNS via the L2TP network tunnel,
the set of connection requests being received at a first call per second (CPS) rate;
determining, by the device, that the first CPS rate exceeds the CAR threshold before sending the set of connection requests to the LNS;
selecting, by the device, a first subset of the set of connection requests based on determining that the first CPS rate exceeds the CAR threshold;
causing, by the device, the first subset of the set of connection requests to be transmitted to the LNS via the L2TP network tunnel,
the first subset of the set of connection requests being transmitted at a second CPS rate that does not exceed the CAR threshold;
dropping, by the device, a second subset of the set of connection requests; and
queuing, by the device, a third subset of the set of connection requests for a particular period of time,
the third subset of the set of connection requests being transmitted to the LNS via the L2TP network tunnel after the particular period of time has elapsed,
causing the third subset of the set of connection requests to be transmitted to the LNS via the L2TP network tunnel comprising:
continuing to cause the third subset of the set of connection requests to be transmitted to the LNS via the L2TP network tunnel until at least one of:
the rate at which the set of connection requests are being received does not exceed the CAR threshold,
the rate at which the set of connection requests are being received is a particular percentage less than the CAR threshold, or
a queue of queued connections is emptied.

16. The method of claim 15, further comprising:
causing the first subset of the set of connection requests to be transmitted to the LNS via the L2TP network tunnel based on determining that the rate at which the set of connection requests are being received is likely to exceed the CAR threshold within a threshold period of time.

17. The method of claim 15, further comprising:
causing the third subset of the set of connection requests to be transmitted from the queue to the LNS after causing the first subset of the set of connection requests to be transmitted to the LNS.

18. The method of claim 15, where the set of connection requests includes at least one of:
a set of packets relating to a tunnel connection request, or
a set of packets relating to a network session connection request.

19. The method of claim 15, establishing the L2TP network tunnel comprises:
receiving the particular message,
the particular message including an attribute-value pair (AVP) identifying the CAR threshold for the LNS; and providing a response message associated with the particular message,
   the response message being associated with indicating that the AVP identifying the CAR threshold was received.

20. The method of claim 15, further comprising:
receiving another L2TP signaling message,
   the other L2TP signaling message including another CAR threshold,
   the other CAR threshold being different from the CAR threshold; and
causing another subset of the set of connection requests to be transmitted to the LNS via the L2TP network tunnel,
   the other subset of the set of connection requests being transmitted at a third CPS rate that does not exceed the other CAR threshold.

* * * * *